United States Patent
Lu et al.

(10) Patent No.: US 11,737,062 B2
(45) Date of Patent: Aug. 22, 2023

(54) WIDEBAND TRANSMISSION SCHEMES IN WIRELESS COMMUNICATIONS

(71) Applicant: MediaTek Singapore Pte. Ltd., Singapore (SG)

(72) Inventors: Kai Ying Lu, San Jose, CA (US); Yongho Seok, San Jose, CA (US); Chao-Chun Wang, San Jose, CA (US); James Chih-Shi Yee, San Jose, CA (US)

(73) Assignee: MediaTek Singapore Pte. Ltd., Singapore (SG)

(*) Notice: Subject to any disclaimer, the term of this patent is extended or adjusted under 35 U.S.C. 154(b) by 150 days.

(21) Appl. No.: 17/166,715

(22) Filed: Feb. 3, 2021

(65) Prior Publication Data

US 2021/0266964 A1    Aug. 26, 2021

Related U.S. Application Data

(60) Provisional application No. 62/991,092, filed on Mar. 18, 2020, provisional application No. 62/980,466, filed on Feb. 24, 2020.

(51) Int. Cl.
*H04W 72/0446* (2023.01)
*H04W 74/00* (2009.01)
*H04W 84/12* (2009.01)
*H04W 16/14* (2009.01)

(52) U.S. Cl.
CPC ....... *H04W 72/0446* (2013.01); *H04W 16/14* (2013.01); *H04W 74/002* (2013.01); *H04W 84/12* (2013.01)

(58) Field of Classification Search
CPC ............ H04W 72/0446; H04W 16/14; H04W 74/002; H04W 84/12
See application file for complete search history.

(56) References Cited

U.S. PATENT DOCUMENTS

| | | | |
|---|---|---|---|
| 2008/0013567 A1 | 1/2008 | Benveniste | |
| 2012/0063406 A1* | 3/2012 | Seok | H04W 28/0268 370/329 |
| 2012/0327870 A1* | 12/2012 | Grandhi | H04W 28/06 370/329 |
| 2016/0157266 A1* | 6/2016 | Wang | H04W 74/004 370/336 |
| 2016/0381565 A1* | 12/2016 | Oteri | H04W 28/18 370/328 |
| 2019/0069324 A1* | 2/2019 | Ansari | H04L 5/001 |
| 2020/0413465 A1 | 12/2020 | Park | |
| 2021/0391947 A1* | 12/2021 | Jang | H04L 5/0044 |
| 2022/0174725 A1 | 6/2022 | Ciochina et al. | |

OTHER PUBLICATIONS

USPTO; Office Action for U.S. Appl. No. 17/166,698; dated Aug. 26, 2022.

* cited by examiner

*Primary Examiner* — Mohammad S Anwar
(74) *Attorney, Agent, or Firm* — Han IP PLLC; Andy M. Han

(57) ABSTRACT

A device obtains a transmission opportunity (TXOP) in a wideband operating bandwidth comprising a primary channel and a plurality of non-primary channels. The device initiates a frame exchange to reserve the TXOP for TXOP sharing. The device also performs a data transmission within the TXOP on one or more of the plurality of non-primary channels. The device then shares the primary channel with a basic service set (BSS) after the frame exchange.

16 Claims, 14 Drawing Sheets

WIDEBAND TRANSMISSION SCHEMES IN WIRELESS COMMUNICATIONS

CROSS REFERENCE TO RELATED PATENT APPLICATION

The present disclosure is part of a non-provisional patent application claiming the priority benefit of U.S. Provisional Patent Application No. 62/980,466, filed 24 Feb. 2020, and U.S. Provisional Patent Application No. 62/991,092, filed 18 Mar. 2020, the contents of which being incorporated by reference in their entirety.

TECHNICAL FIELD

The present disclosure is generally related to wireless communications and, more particularly, to wideband transmission schemes in wireless communications.

BACKGROUND

Unless otherwise indicated herein, approaches described in this section are not prior art to the claims listed below and are not admitted as prior art by inclusion in this section.

In the context of wireless communications such as wireless local area network (WLANs) in accordance with one or more Institute of Electrical and Electronics Engineers (IEEE) 802.11 standards, a device in a contention-based channel access system can access a medium in a wideband, including multiple narrow bands (or channels), by sensing a primary channel and transmitting when the primary channel is idle. Under a dynamic bandwidth transmission scheme, the device is allowed to transmit frames on the primary and one or more non-primary channels which are idle. Additionally, with a preamble puncturing mechanism without puncturing the primary channel, usage of the spectrum is increased when there are radar signals, incumbent signals or overlapping basic service set (OBSS) interferences occurring in one or more non-primary channels.

In next-generation wireless communication systems in which a wider operating bandwidth (e.g., 320 MHz/160+160 MHz/240 MHz/160+80 MHz/160 MHz) is supported, channel contention is allowed on the primary channel but not on non-primary channels. In case the primary channel is overloaded or busy for channel contention, then no transmission would be allowed to result in the spectrum of the wideband channel being under-utilized. Moreover, legacy devices need to be protected and fairness issues also need to be considered. Therefore, there is a need for a solution for wideband transmission schemes in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses to address aforementioned issues/problems. Under various schemes proposed herein, wideband transmission in wireless communications may be implemented to further increase spectrum reuse to allow multiple service sets to share wideband resources. For instance, traffic on the primary channel may be controlled so that the primary channel would not be very busy and multiple service sets may access the primary channel rather easily. Also, non-primary channels may be reused in the spatial domain and/or reused in the spectrum/frequency domain without introducing interference on an ongoing transmission. Moreover, fairness to legacy devices may be guaranteed.

In one aspect, a method may involve obtaining a transmission opportunity (TXOP) in a wideband operating bandwidth comprising a primary channel and a plurality of non-primary channels. The method may also involve initiating a frame exchange to reserve the TXOP for TXOP sharing. The method may additionally involve performing a data transmission within the TXOP on one or more of the plurality of non-primary channels. The method may further involve sharing the primary channel with a basic service set (BSS) after the frame exchange.

In another aspect, a method may involve detecting, on a primary channel in a wideband operating bandwidth comprising the primary channel and a plurality of non-primary channels, a frame exchange which results in a TXOP being reserved for sharing. The method may also involve starting or resuming a backoff procedure to contend for a medium of the primary channel within the TXOP. The method may further involve initiating a wideband sharing transmission opportunity (WSTXOP) within the TXOP. The method may additionally involve performing a data transmission within the WSTXOP on one or more of the plurality of non-primary channels.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to wideband transmission schemes in wireless communications. According to the present disclosure, a number of possible solutions may be implemented separately or jointly. That is, although these possible solutions may be described below separately, two or more of these possible solutions may be implemented in one combination or another.

In the present disclosure, a basic service set (BSS) is assumed to be set up with a 160-MHz operating bandwidth, with a first access point (AP1) of the BSS operating in the 160-MHz bandwidth. It is also assumed that an overlapping basic service set (OBSS) is set up with a 320-MHz operating bandwidth, with a second access point (AP2) of the OBSS operating in the 320-MHz operating bandwidth. It is further assumed that the BSS and the OBSS have the same 20-MHz primary channel for channel contention. Furthermore, in the present disclosure, the term "primary channel" refers to a 20-MHz channel where medium access through channel contention is allowed, and the term "non-primary channel" refers to a 20-MHz channel which is not a primary channel in the wideband operating bandwidth. It is noteworthy that an access point (AP) or AP station (STA) is interchangeably referred to as an "AP" while a "non-AP STA" is interchangeably referred to as an "STA" herein. The term "STA" is a general name used to refer to either a "non-AP STA" or an "AP STA" herein.

Figure 1:
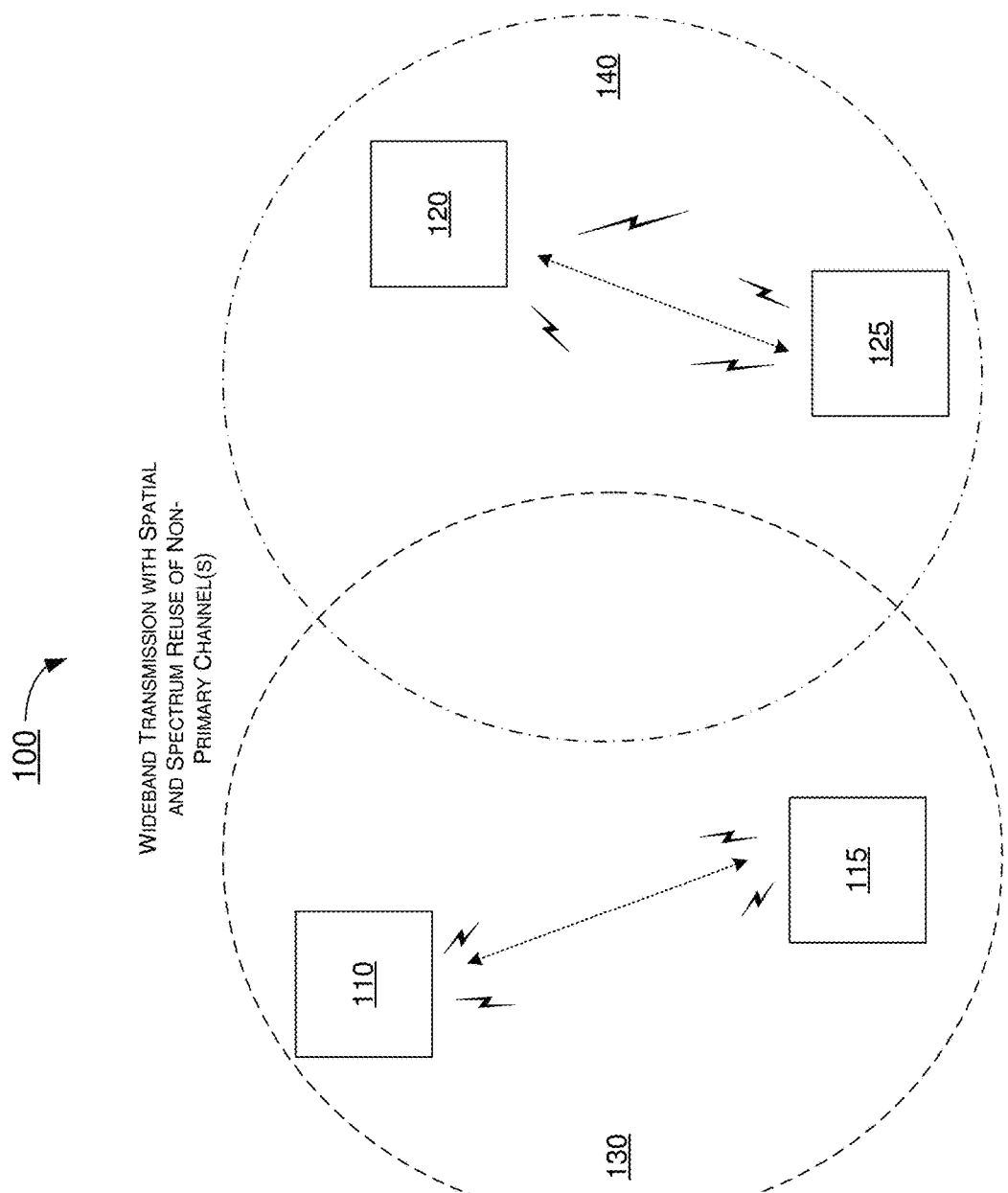
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 11 illustrate examples of implementation of various proposed schemes in network environment 100 in accordance with the present disclosure. The following description of various proposed schemes is provided with reference to FIG. 1~FIG. 11.

Referring to FIG. 1, network environment 100 may involve STA 110, STA 115, STA 120 and a STA 125 communicating wirelessly in accordance with one or more IEEE 802.11 standards (e.g., IEEE 802.11be). Each of STA 110 and STA 120 may function as an AP, and each of STA 115 and STA 125 may function as a non-AP STA. Each of STA 110 and STA 115 may be associated with or otherwise belong to a BSS 130 with a wide operating bandwidth (e.g., 160 MHz or another bandwidth greater than 80 MHz). Each of STA 120 and STA 125 may be associated with or otherwise belong to a OBSS 140 with a wide operating bandwidth (e.g., 320 MHz or another bandwidth greater than 80 MHz). BSS 130 and OBSS 140 may have the same 20-MHz primary channel for channel contention. Under various proposed schemes in accordance with the present disclosure, STA 110, STA 115, STA 120 and a STA 125 may be configured to perform wideband transmission schemes in wireless communications in accordance with various proposed schemes described below.

Under a proposed scheme in accordance with the present disclosure, a device (e.g., STA 110 and/or STA 120) may contend for a primary channel and initiate a specific frame exchange (e.g., request-to-transmit (RTTX)/clear-to-transmit (CTTX) frame exchange) to reserve a TXOP on the primary channel when a backoff counter or timer counts down to zero. The RTTX/CTTX frame exchange may be duplicated on one or more non-primary channels which are idle (e.g., having a point coordination function (PCF) interframe spacing (PIFS) interval being idle before the transmission of RTTX). The RTTX/CTTX frames exchanged may indicate bandwidth information, preamble puncture information, and so on. Under the proposed scheme, the RTTX/CTTX frame exchange may set or update a $3^{rd}$-party device intra-BSS timer in case the RTTX/CTTX frame is from its own BSS. Moreover, the RTTX/CTTX frame exchange may not set or update the $3^{rd}$-party device inter-BSS timer in case the RTTX/CTTX frame is from an OBSS. Legacy devices may set or update their timers so that the legacy devices may not access the wireless medium on the primary channel within a duration of the TXOP, or TXOP duration, the information of which may be obtained from the received RTTX/CTTX frame exchange.

Under a proposed scheme in accordance with the present disclosure, OBSS devices which are not legacy devices do not set or update their inter-BSS timer so that their backoff procedures may be started or resumed to contend for the wireless medium on the primary channel within the TXOP duration the information of which being obtained from the received RTTX/CTTX frame exchange on the primary channel after the RTTX/CTTX frame exchange. Under the proposed scheme, a wideband sharing transmission opportunity (WSTXOP) may be initiated within the TXOP duration the information of which being obtained from the received RTTX/CTTX frame exchange on the primary channel with a successful RTTX/CTTX frame exchange within the TXOP. Additionally, data transmission within the WSTXOP may be on the non-primary channels not occupied by the sharing TXOP indicated by the received RTTX/CTTX, which are idle but not on other channels. Moreover, a duration of the WSTXOP may be limited by the TXOP duration the information of which being obtained from the received RTTX/CTTX frame exchange on the primary channel.

Figure 2:
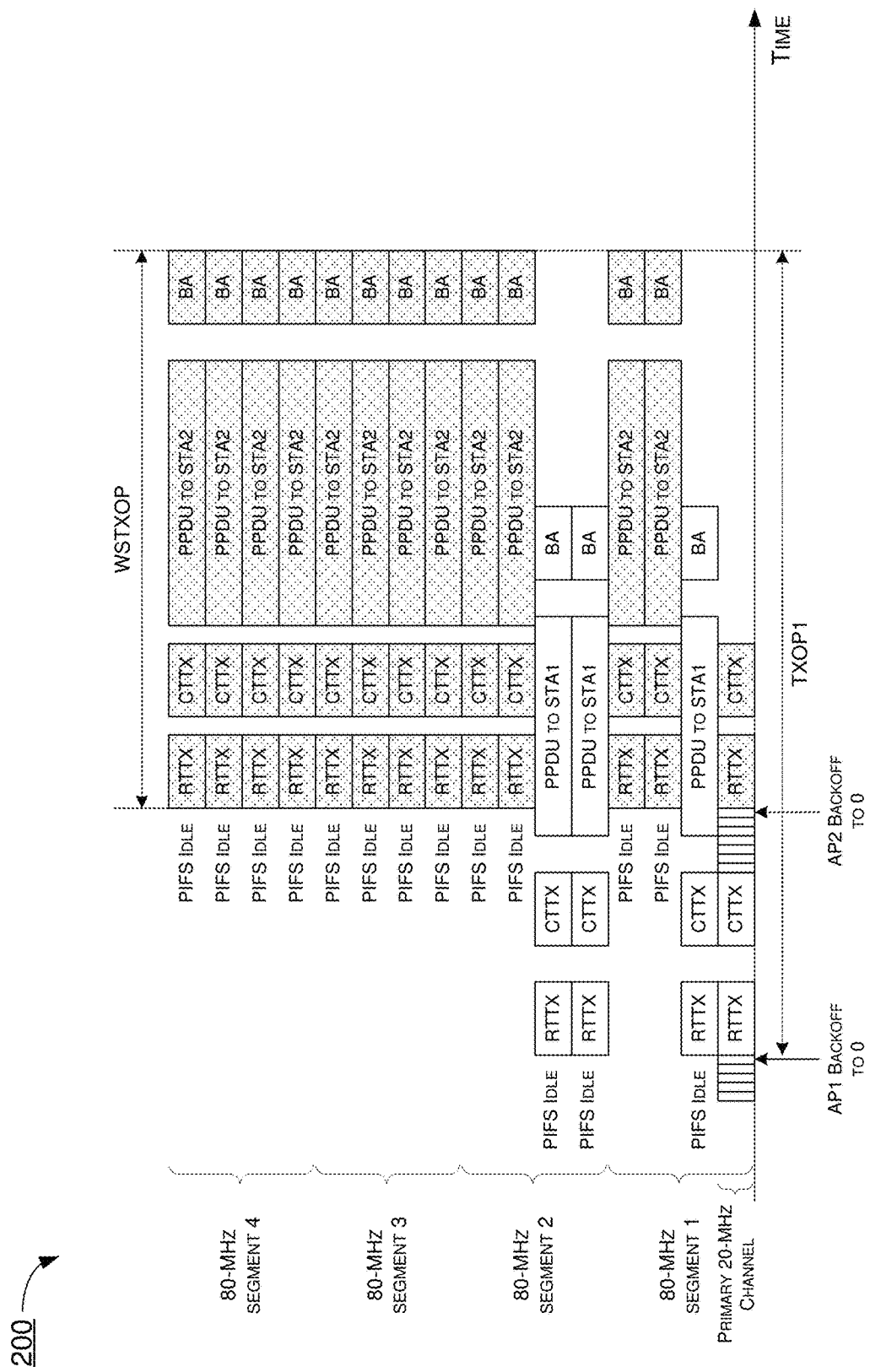
FIG. 2 is a diagram of an example scenario in accordance with the present disclosure.

FIG. 2 illustrates an example scenario 200 of a wideband transmission scheme in accordance with the present disclosure. In scenario 200, a first device (e.g., STA 110 as AP1 in FIG. 2) associated with a BSS (e.g., BSS 130) capable of wideband transmissions may initiate a specific frame exchange (e.g., RTTX/CTTX frame exchange) to reserve a TXOP on the primary channel when the primary channel is idle. Additionally, the RTTX/CTTX frame exchange may be duplicated (e.g., also performed) on one or more non-primary channels which are idle during a PIFS interval before the RTTX transmission. Moreover, subsequent data transmission(s) within the TXOP initiated by the RTTX/CTTX frame exchange may not be on the primary channel. For instance, subsequent data transmission(s) within the TXOP initiated by the RTTX/CTTX frame exchange may be on the one or more non-primary channels which are idle from both the side of the TXOP initiator and the side of the TXOP responder.

In scenario 200, a second device (e.g., STA 120 as AP2 in FIG. 2) associated with an OBSS may initiate a WSTXOP with an RTTX/CTTX frame exchange within the TXOP duration the information of which being obtained from the received RTTX/CTTX frame exchange. The second device may not set or update its inter-BSS timer based on the received RTTX/CTTX frame exchange. Nevertheless, the second device may perform a number of operations, including: (1) setting its WSTXOP timer based on information of the TXOP duration obtained from the received RTTX/CTTX frame exchange; (2) starting or resuming its backoff timer after receiving the RTTX/CTTX frame exchange or CTTX frame on the primary channel; (3) transmitting RTTX on the primary channel when the backoff timer counts down to zero and its WSTXOP timer is not zero; and (4) duplicating the RTTX frame on the one or more non-primary channels which are not occupied by the sharing TXOP indicated in the RTTX/CTTX frame exchange and which are idle during the PIFS interval before transmission. Furthermore, in scenario 200, a non-AP STA2 (e.g., STA 125) responds with a CTTX frame on the corresponding non-primary channel(s) which are idle.

In scenario 200, data transmissions within the WSTXOP may only be on the one or more non-primary channels which are idle indicated by the RTTX/CTTX frame exchange which initiating the WSTXOP. The WSTXOP data transmission may not be performed on the primary channel, and during the WSTXOP preamble puncturing may be applied on one or more non-primary channels which are not idle. It is noteworthy that a duration of the WSTXOP may be limited by a WSTXOP timer. Moreover, the primary channel may be used for channel contention and devices (except legacy devices) may only transmit control frames, management frames or broadcast frames on the primary channel.

Figure 3:
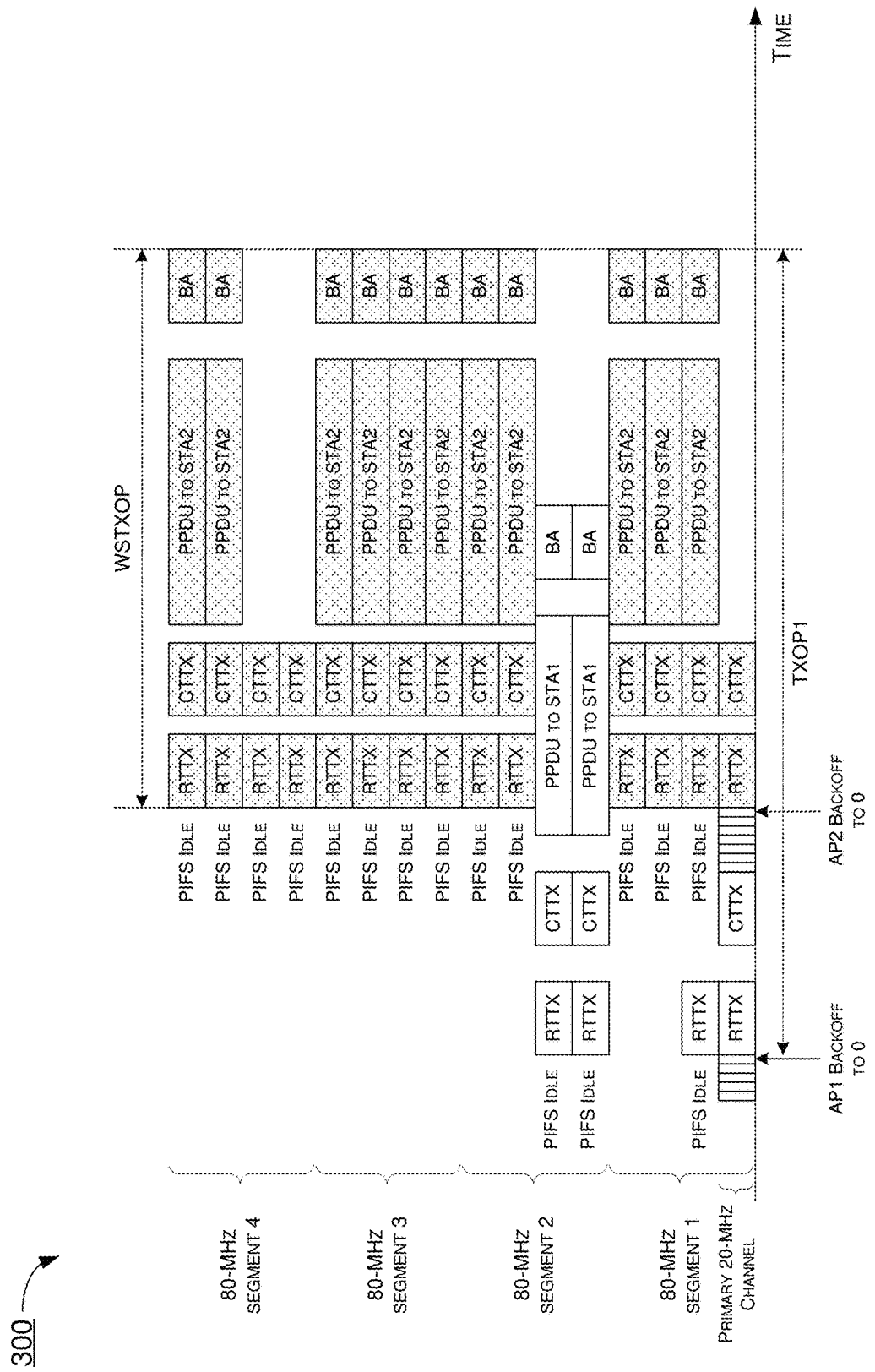
FIG. 3 is a diagram of an example scenario in accordance with the present disclosure.

FIG. 3 illustrates an example scenario 300 of a wideband transmission scheme in accordance with the present disclosure. In scenario 300, data transmission in TXOP1 may be only on two non-primary channels after dynamic bandwidth negotiation between RTTX and CTTX. The RTTX/CTTX frame exchange for the WSTXOP initiated by AP2 may be duplicated on one or more non-primary channels which are not occupied by the data transmission of TXOP1 and which are idle during a PIFS interval before RTTX transmission. In case that AP2 receives the RTTX of the TXOP1 but does not receive the CTTX of TXOP1 on the primary channel, then AP2 may defer the start or resumption of its backoff procedure by a specific time interval (e.g., a short inter-frame spacing (SIFS) interval plus the transmission time of the CTTX). Moreover, STA2 may negotiate dynamic bandwidth with AP2 by transmitting the CTTX on the one or more non-primary channels which are idle for both AP2 and STA2. The data transmission within the WSTXOP may be performed on the non-primary channel(s) negotiated between AP2 and STA2.

It is noteworthy that, in a wide bandwidth system having an operating bandwidth of 240 MHz, 160+80 MHz, 320 MHz or 160+160 MHz, the wide bandwidth may not be fully utilized in case most user devices only support narrower bandwidth, such as 80 MHz, 160 MHz, or 80+80 MHz, due to the fact that channel contention mechanism only operates on the primary channel. Under a proposed scheme in accordance with the present disclosure, a primary channel and one or more auxiliary primary channels may be configured in a BSS (e.g., BSS 130). Under the proposed scheme, a 20-MHz channel may be designated as the primary channel for a specific duration of the BSS for contention-based channel access (e.g., energy detection channel access (EDCA)) operation. Moreover, one or more 20-MHz channels of different segments of the BSS operating bandwidth may be designed as auxiliary primary channel(s) for channel access when the primary 20-MHz channel is blocked/busy. For a specific time interval or duration, an auxiliary primary channel of a different channel segment may be designated as the primary channel of the BSS. An AP device may signal when the following occurs: an auxiliary primary channel becomes the primary channel and the current primary channel becomes an auxiliary primary channel.

Under the proposed scheme, a wideband system may apply a dynamic primary channel scheme to control channel access. For instance, an AP device may designate one primary 20-MHz channel for a specific duration for contention-based channel access (e.g., EDCA). The AP device may also designate one or more 20-MHz channels of different channel segment(s) of the BSS operating bandwidth as auxiliary primary channel(s) for it to access the channel when the primary 20-MHz channel is blocked/busy. The AP device may control and signal the primary channel among the auxiliary primary 20-MHz channels located in different bandwidth parts/segments for different duration. Non-AP devices parking on the primary 20-MHz channel may contend for the channel using EDCA, and non-AP devices associated with the AP device may park on an auxiliary primary 20-MHz channel of a bandwidth part/segment. The AP device may control channel access mode for non-AP devices parking on the auxiliary primary 20-MHz channels to be restricted from contention-based channel access. For instance, the AP device may change EDCA parameters to low priority parameters or allow trigger-based UL only, or the AP device may change an MU-EDCA counter setting to a specific value to disallow EDCA.

Figure 4:
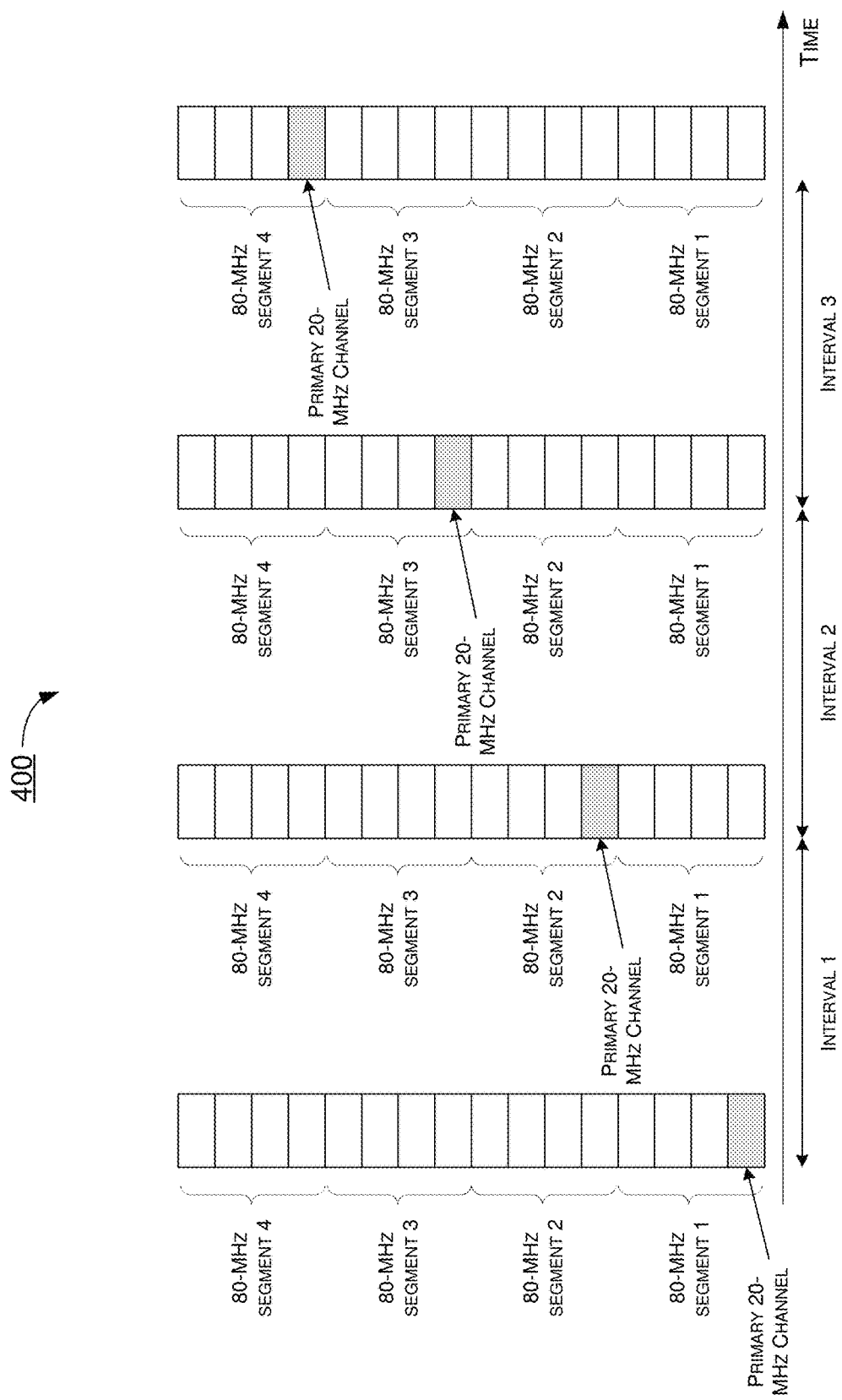
FIG. 4 is a diagram of an example scenario in accordance with the present disclosure.

FIG. 4 illustrates an example scenario 400 of a dynamic primary channel scheme in accordance with the present disclosure. In scenario 400, within each interval, a primary 20-MHz channel may be designated in an 80-MHz bandwidth part/segment. Additionally, only one primary 20-MHz channel may be used for channel contention. Moreover, different intervals may have different primary 20-MHz channels located in different 80-MHz bandwidths parts/segments. Furthermore, a change in the primary channel may be indicated by an AP device, and a duration of such a change may also be indicated by the AP device.

Under a proposed scheme in accordance with the present disclosure, within a specific duration one primary channel and auxiliary primary channel(s) may be used by an AP device for channel access. For instance, within a specific duration, a primary 20-MHz channel may be designated for channel access and one or more 20-mHz channels may be designated as auxiliary primary channel(s) for channel access when the primary 20-MHz channel is blocked/busy. The auxiliary primary channel(s) may be located in different bandwidth part(s)/segment(s). An auxiliary primary channel may become a default primary channel when the AP device signals a switch of the primary channel to a corresponding bandwidth part/segment. The auxiliary primary channel(s) may be dynamically accessed by the AP device based on EDCA channel contention when the primary channel is blocked/busy. The AP device may uniformly perform a random selection of one or more auxiliary primary channels for channel access when the primary channel is blocked/busy. When selecting multiple auxiliary primary channels for channel access, the one auxiliary primary channel which backs off to zero first may be used for channel access.

Figure 5:
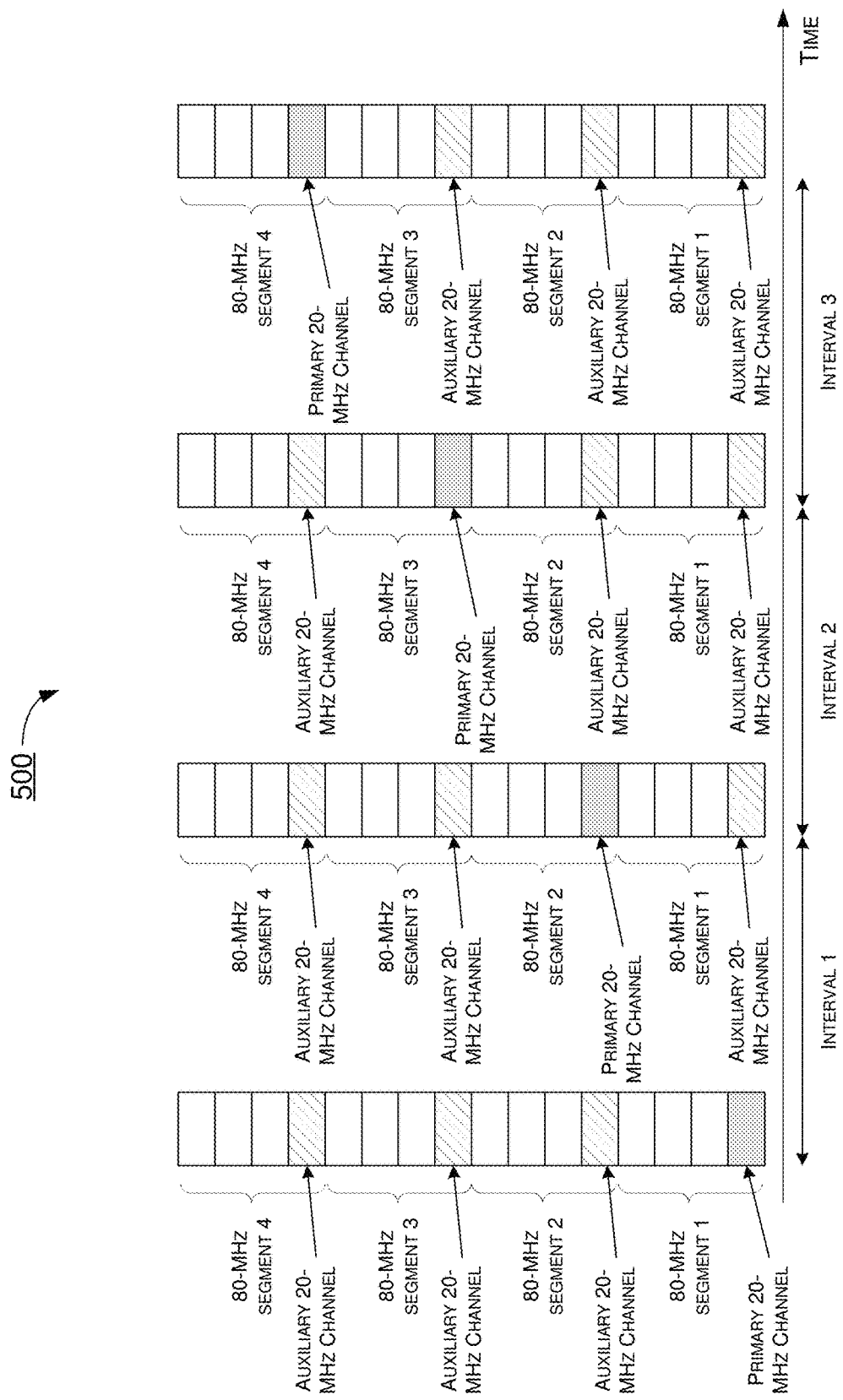
FIG. 5 is a diagram of an example scenario in accordance with the present disclosure.

FIG. 5 illustrates an example scenario 500 of a dynamic primary channel scheme in accordance with the present disclosure. In scenario 500, within each interval, there may be one primary 20-MHz channel designated in an 80-MHz bandwidth part/segment and multiple 20-MHz channels designated as auxiliary primary channels in other bandwidth parts/segments. An auxiliary primary 20-MHz channel in a specific interval may be the primary channel in another interval. For instance, as shown in FIG. 5, the auxiliary primary 20-MHz channel of the 80-MHz segment 2 in interval 1 may become the primary 20-MHz channel of the 80-MHz segment 2 in interval 2.

Under a proposed scheme in accordance with the present disclosure, an AP device operating in a wide bandwidth may utilize the dynamic primary channel scheme to provide flexible channel access opportunities. The AP device may partition the wide bandwidth into multiple bandwidth parts (or segments) and configure a 20-MHz channel as the primary channel or auxiliary primary channel for each bandwidth part separately. The AP device may activate a primary channel of one bandwidth part for contention-based channel access within a specific duration. Within the specific duration, the auxiliary primary channels located in other bandwidth parts may be used for the AP device to have channel access when the primary 20-MHz channel is blocked/busy. The auxiliary primary channels may be dynamically accessed based on EDCA channel contention when the primary channel is blocked/busy. The AP device may select one or more auxiliary primary channels for channel access when the primary channel is blocked/busy. When selecting multiple auxiliary primary channels for channel access, multiple backoff procedures may be performed on the auxiliary primary channels, and the first one with its backoff counter reaching zero may be used for channel access. An auxiliary primary channel may become the primary channel when the AP device indicates a change in the primary channel to the corresponding bandwidth part/segment.

Figure 6:
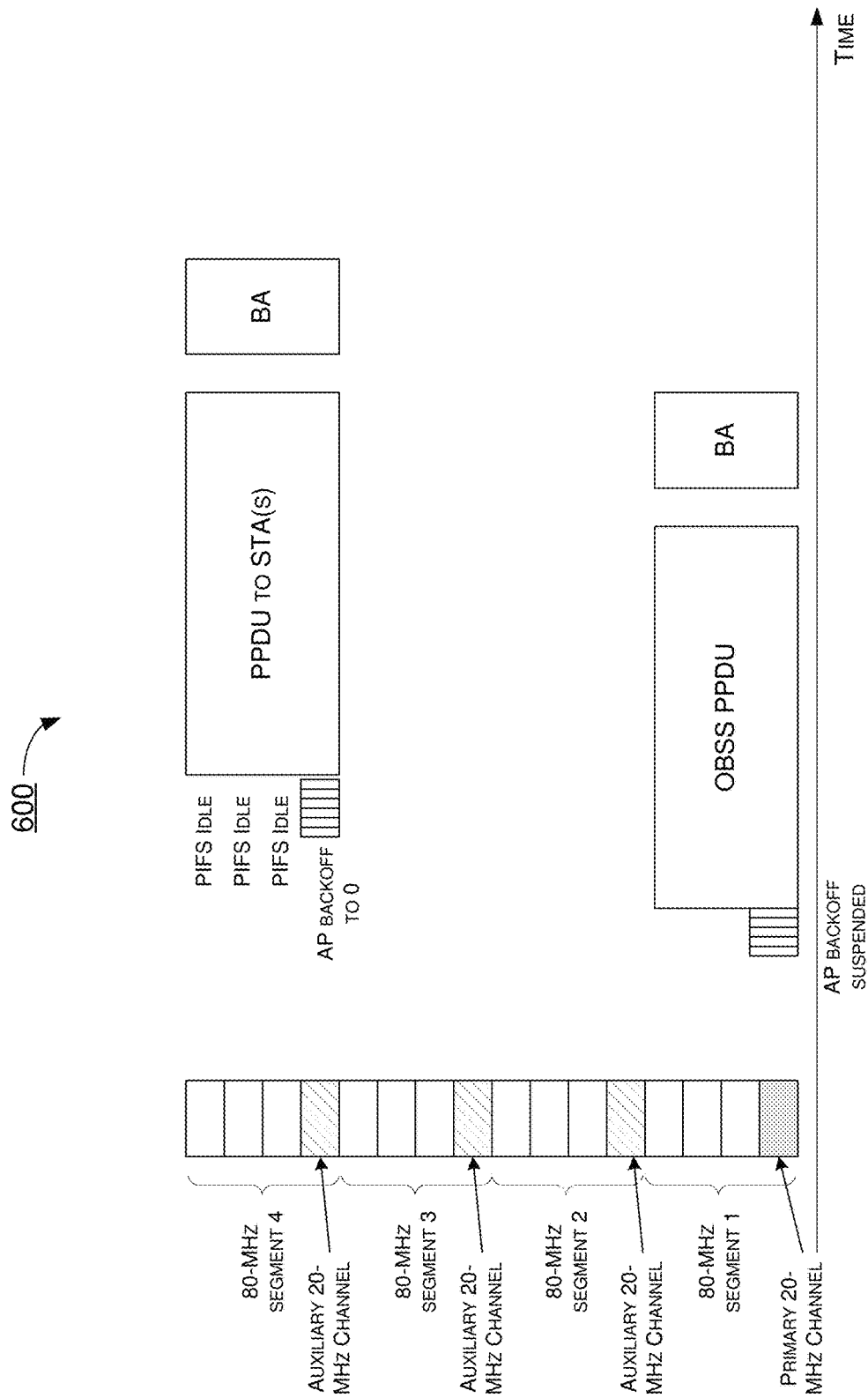
FIG. 6 is a diagram of an example scenario in accordance with the present disclosure.

FIG. 6 illustrates an example scenario 600 of a dynamic primary channel scheme in accordance with the present disclosure. In scenario 600, an AP device may select one auxiliary primary channel for channel access when the primary channel is blocked due to interference. A backoff counter may start to count down based on a CCA detection on the selected auxiliary primary channel. ED detection may be performed on other channels within the bandwidth part/segment (e.g., PIFS check immediately before transmission).

Figure 7:
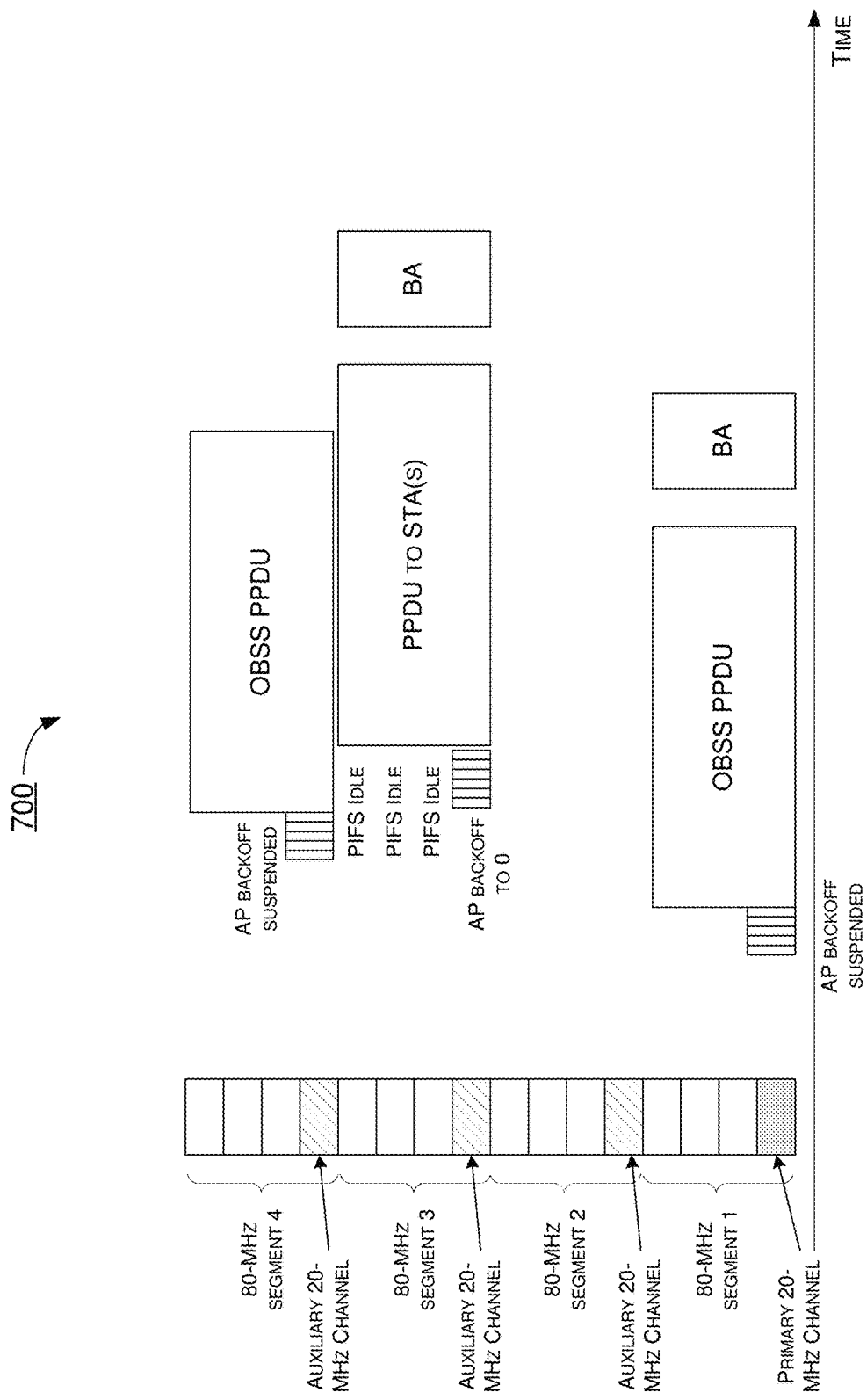
FIG. 7 is a diagram of an example scenario in accordance with the present disclosure.

FIG. 7 illustrates an example scenario 700 of a dynamic primary channel scheme in accordance with the present disclosure. In scenario 700, an AP device may select one auxiliary primary channel for channel access when the primary channel is blocked. A backoff counter may start to count down based on a CCA detection on the selected auxiliary primary channel. In case the selected auxiliary primary channel is also blocked, then the AP device may select another auxiliary primary channel for channel access. In case the primary 20-MHz channel is unblocked (e.g., NAV equals to zero or physical CS indicates idle), then the AP device may switch back to the primary channel for channel access.

Figure 8:
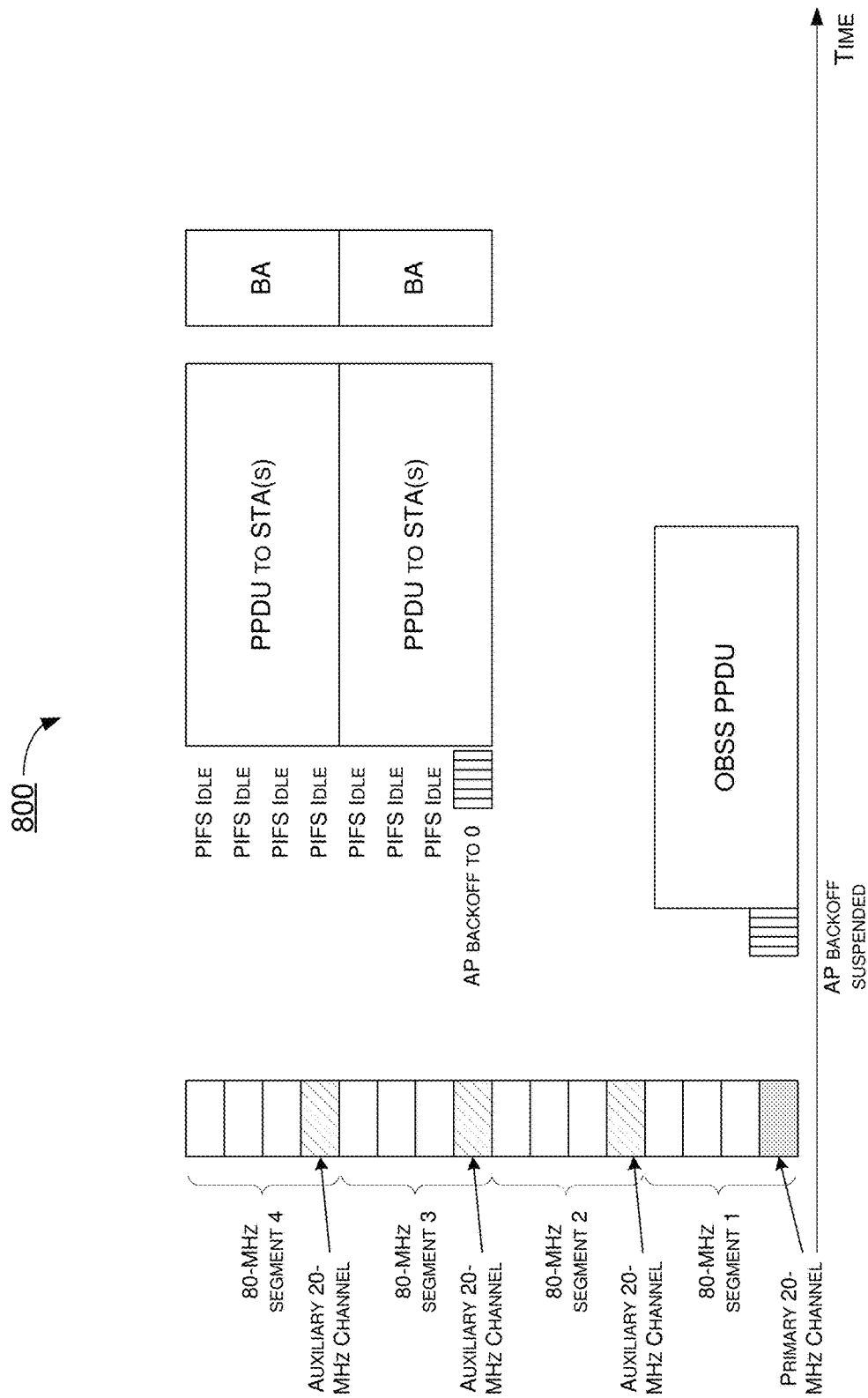
FIG. 8 is a diagram of an example scenario in accordance with the present disclosure.

FIG. 8 illustrates an example scenario 800 of a dynamic primary channel scheme in accordance with the present disclosure. In scenario 800, the AP device may select one auxiliary primary channel for channel access when the primary channel is blocked. A backoff counter may start to count down based on a CCA detection on the selected auxiliary primary channel. ED detection on other channels within multiple bandwidth parts/segments may be performed (e.g., PIFS check immediately before transmission).

Figure 9:
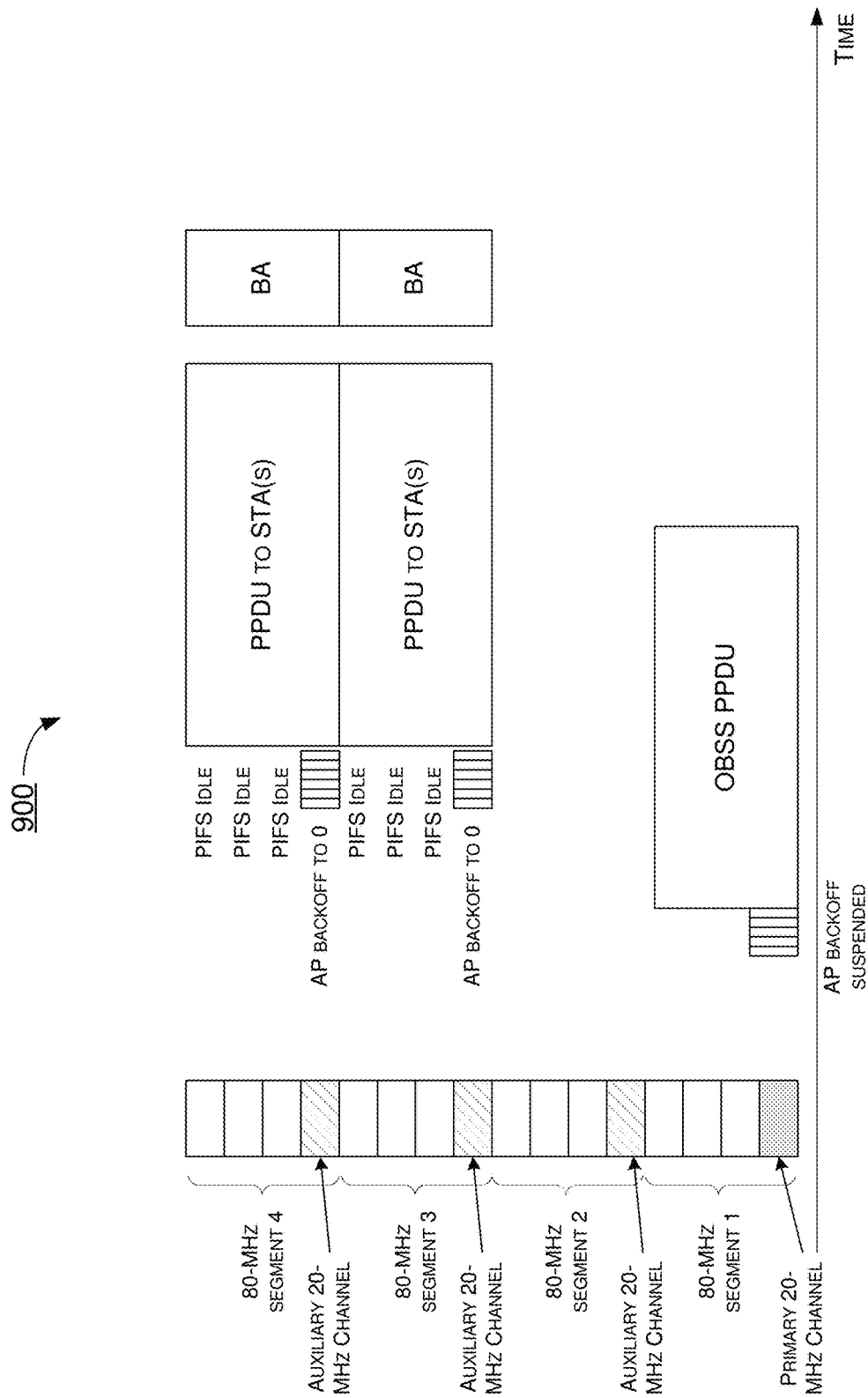
FIG. 9 is a diagram of an example scenario in accordance with the present disclosure.

FIG. 9 illustrates an example scenario 900 of a dynamic primary channel scheme in accordance with the present disclosure. In scenario 900, an AP device may select multiple auxiliary primary channels for channel access when the primary channel is blocked. EDCA backoff procedure may be performed on each selected auxiliary primary channel with an initial value. The initial value of each backoff counter may be the same or different. A backoff counter may start to count down based on a CCA detection on the selected auxiliary primary channels respectively. ED detection on other channels within each bandwidth part/segment may be performed (e.g., PIFS check immediately before transmission).

Figure 10:
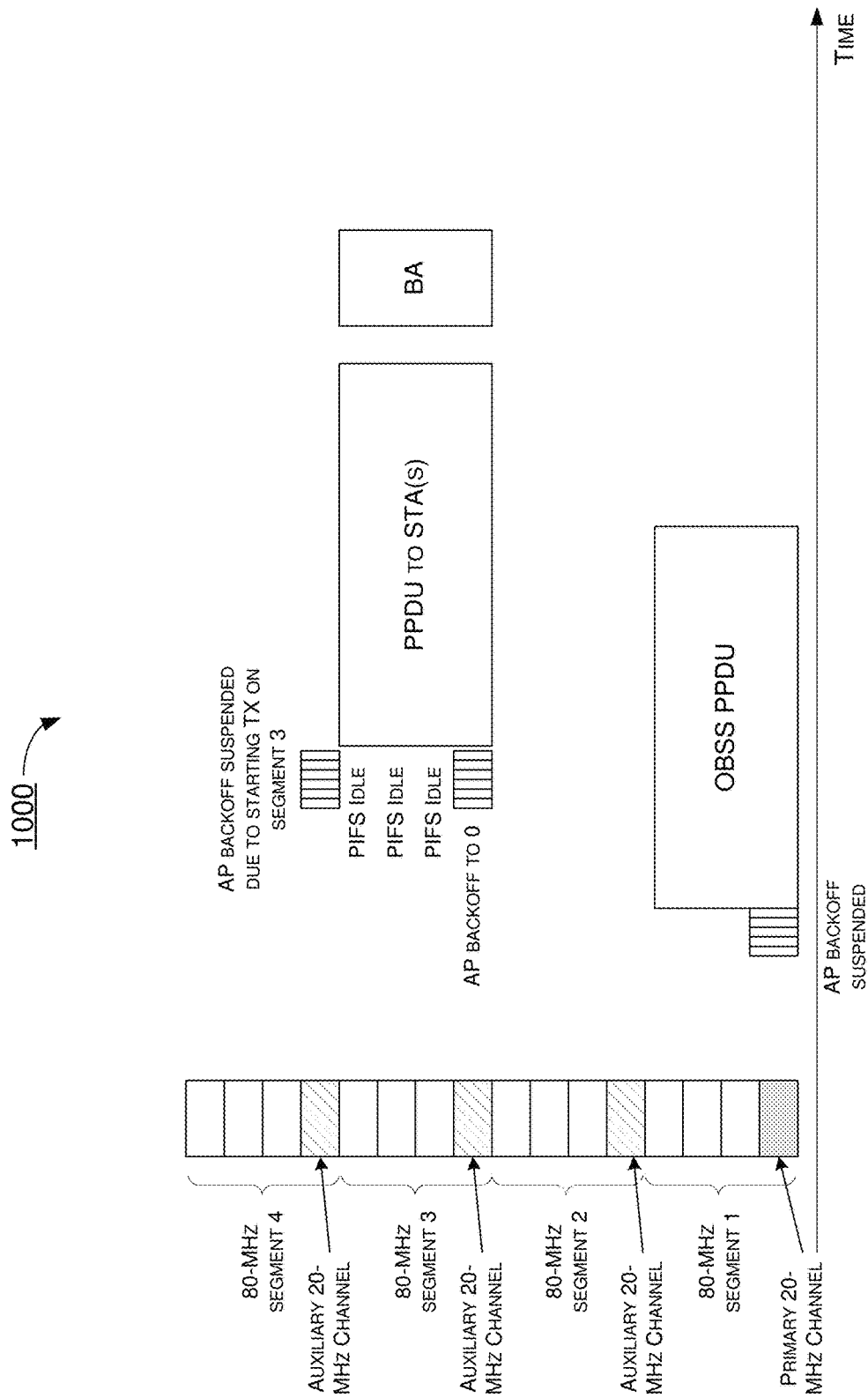
FIG. 10 is a diagram of an example scenario in accordance with the present disclosure.

FIG. 10 illustrates an example scenario 1000 of a dynamic primary channel scheme in accordance with the present disclosure. In scenario 1000, an AP device may select multiple auxiliary primary channels for channel access when the primary channel is blocked. EDCA backoff procedure may be performed on each selected auxiliary primary channel with its own initial value. A backoff counter may start to count down based on a CCA detection on the selected auxiliary primary channels respectively. In scenario 1000, backoff on segment 4 may be suspended after the backoff on segment 3 counts down to zero.

Figure 11:
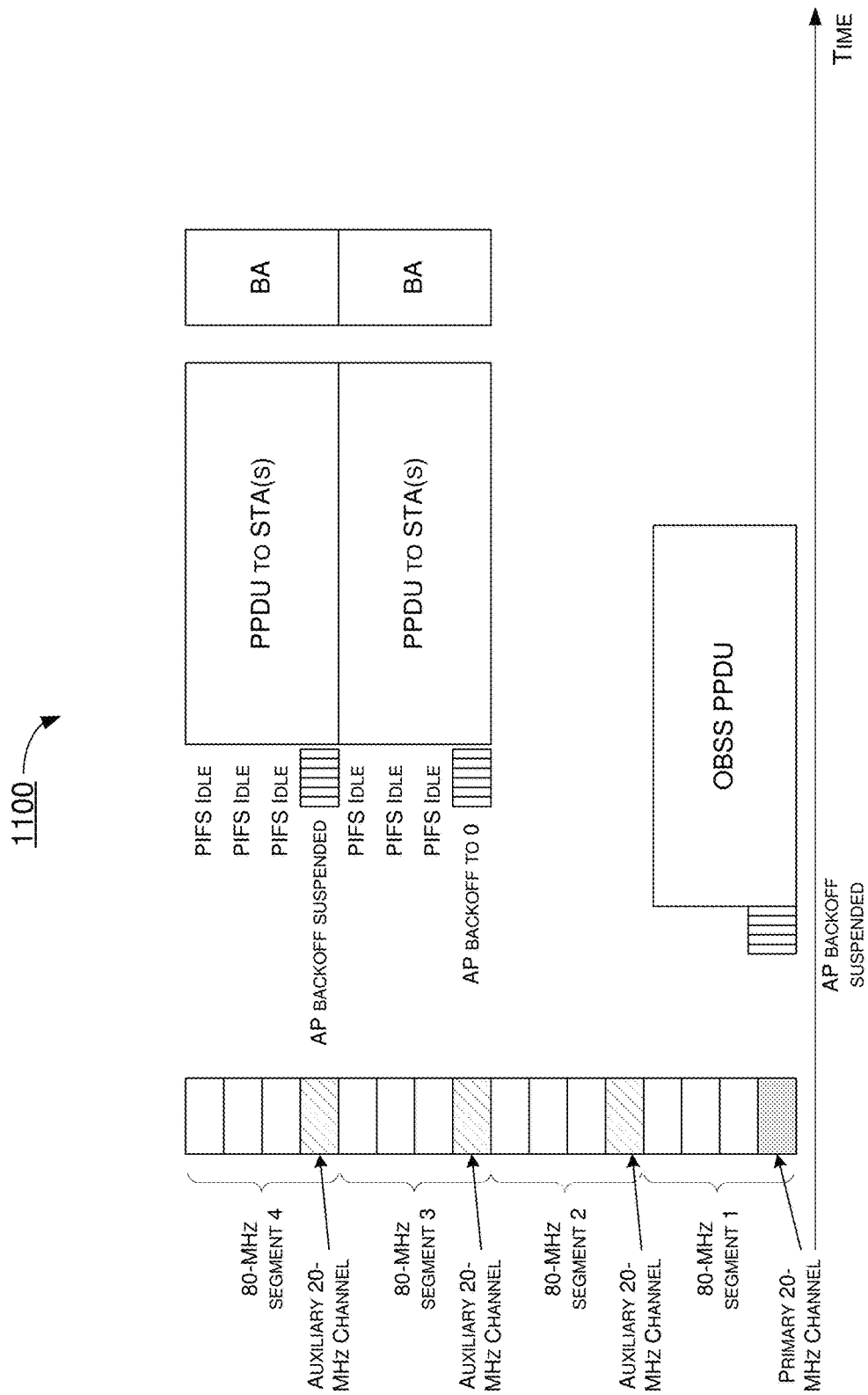
FIG. 11 is a diagram of an example scenario in accordance with the present disclosure.

FIG. 11 illustrates an example scenario 1100 of a dynamic primary channel scheme in accordance with the present disclosure. In scenario 1100, an AP device may select multiple auxiliary primary channels for channel access when the primary channel is blocked. EDCA backoff procedure may be performed on each selected auxiliary primary channel with its own initial value. A backoff counter may start to count down based on a CCA detection on the selected auxiliary primary channels respectively. In scenario 1100, backoff on segment 4 may be suspended after the backoff on segment 3 counts down to zero. Moreover, ED detection on other channels including the auxiliary primary channel of segment 4 may be performed (e.g., PIFS check immediately before transmission).

Thus, under the proposed schemes described above with respect to FIG. 4~FIG. 11, one primary channel and multiple auxiliary primary channels may be designated for a BSS (e.g., BSS 130) within a time interval or as indicated by system information. For instance, for a BSS with a 320-MHz operating bandwidth, the 320-MHz bandwidth may be divided into four 80-MHz bandwidth segments with one 20-MHz primary channel designated for each one of the 80-MHz bandwidth segments to have a total of four primary channels in the 320-MHz operating bandwidth. Among the four primary channels, one primary channel may be a designated primary channel for the entire 320-MHz bandwidth, and the other three primary channels may be auxiliary primary channels. An AP device of the BSS may change the designated primary channel to be an auxiliary primary channel for a certain time interval or as explicitly indicated.

Moreover, under the proposed schemes described above with respect to FIG. 4~FIG. 11, flexible channel access rules may be applied based on status of the designated primary channel and auxiliary primary channels. For instance, the AP device may perform EDCA-based channel contention on the current designated primary channel. The auxiliary primary channels in the other 80-MHz bandwidth segments may be used for the AP device to perform EDCA-based channel contention when the designated primary channel is blocked/busy. When selecting multiple auxiliary primary channels for channel access, one or ore backoff procedures may be performed on the auxiliary primary channels. The first one of such backoff procedures with its backoff counter counting down to zero may be used for channel access. Accordingly, in the examples shown in FIG. 4~FIG. 11, auxiliary primary channels may be used for channel contention when the primary channel is blocked/busy, thereby improving bandwidth utilization when the primary channel is not available.

Illustrative Implementations

Figure 12:
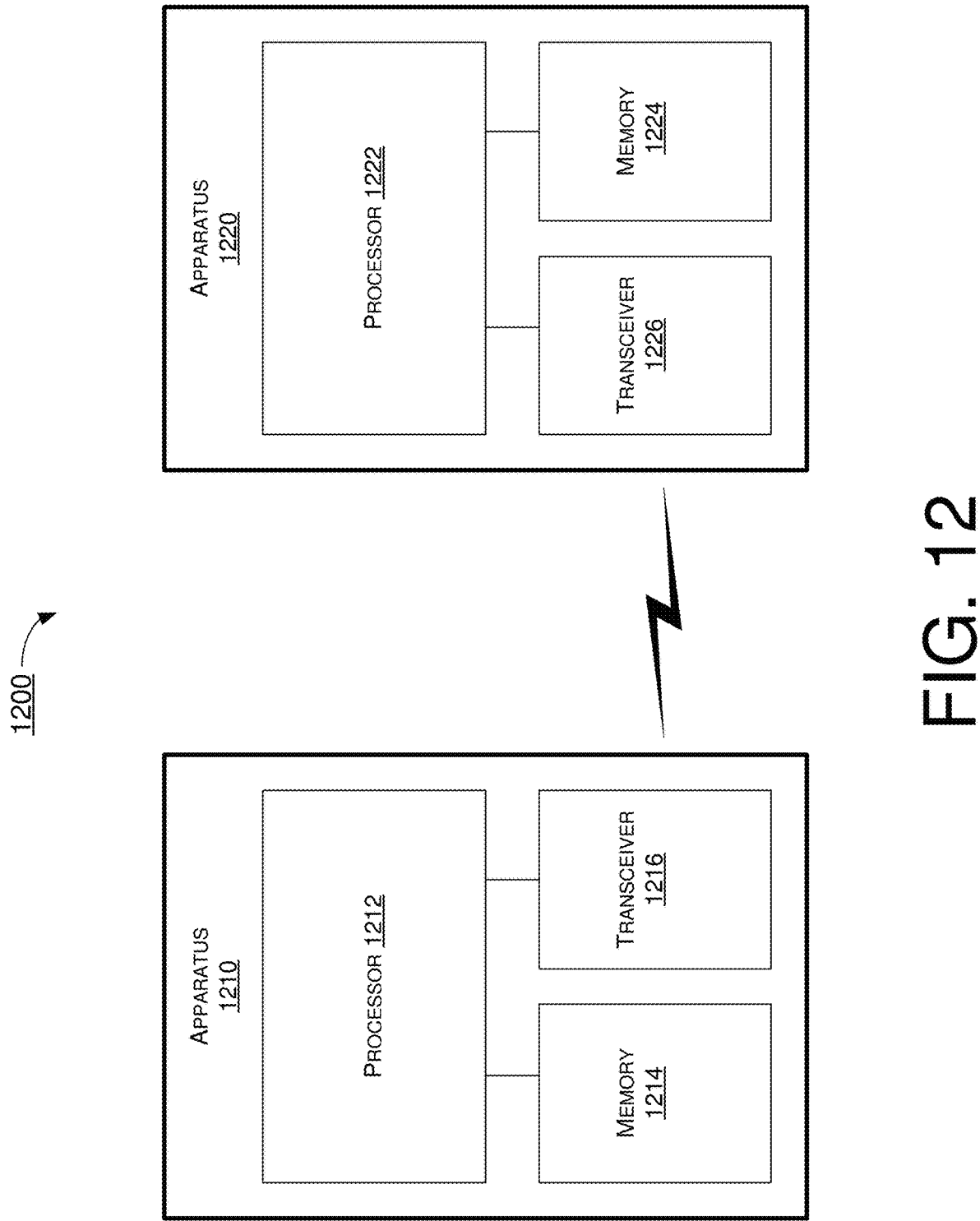
FIG. 12 is a block diagram of an example communication system in accordance with an implementation of the present disclosure.

FIG. 12 illustrates an example system 1200 having at least an example apparatus 1210 and an example apparatus 1220 in accordance with an implementation of the present disclosure. Each of apparatus 1210 and apparatus 1220 may perform various functions to implement schemes, techniques, processes and methods described herein pertaining to wideband transmission schemes in wireless communications, including the various schemes described above with respect to various proposed designs, concepts, schemes, systems and methods described above as well as processes described below. For instance, apparatus 1210 may be implemented in one of STA 110 or STA 120 and apparatus 1220 may be implemented in the other of STA 110 or STA 120, or vice versa.

Each of apparatus 1210 and apparatus 1220 may be a part of an electronic apparatus, which may be a STA or an AP, such as a portable or mobile apparatus, a wearable apparatus, a wireless communication apparatus or a computing apparatus. When implemented in a STA, each of apparatus 1210 and apparatus 1220 may be implemented in a smartphone, a smart watch, a personal digital assistant, a digital camera, or a computing equipment such as a tablet computer, a laptop computer or a notebook computer. Each of apparatus 1210 and apparatus 1220 may also be a part of a machine type apparatus, which may be an IoT apparatus such as an immobile or a stationary apparatus, a home apparatus, a wire communication apparatus or a computing apparatus. For instance, each of apparatus 1210 and apparatus 1220 may be implemented in a smart thermostat, a smart fridge, a smart door lock, a wireless speaker or a home control center. When implemented in or as a network apparatus, apparatus 1210 and/or apparatus 1220 may be implemented in a network node, such as an AP in a WLAN.

In some implementations, each of apparatus 1210 and apparatus 1220 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1210 and apparatus 1220 may be implemented in or as a STA or an AP. Each of apparatus 1210 and apparatus 1220 may include at least some of those components shown in FIG. 12 such as a processor 1212 and a processor 1222, respectively, for example. Each of apparatus 1210 and apparatus 1220 may further include one or more other components not pertinent to the proposed scheme of the present disclosure (e.g., internal power supply, display device and/or user interface device), and, thus, such component(s) of apparatus 1210 and apparatus 1220 are neither shown in FIG. 12 nor described below in the interest of simplicity and brevity.

In one aspect, each of processor 1212 and processor 1222 may be implemented in the form of one or more single-core processors, one or more multi-core processors, one or more RISC processors or one or more CISC processors. That is, even though a singular term "a processor" is used herein to refer to processor 1212 and processor 1222, each of processor 1212 and processor 1222 may include multiple processors in some implementations and a single processor in other implementations in accordance with the present disclosure. In another aspect, each of processor 1212 and processor 1222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1212 and processor 1222 is a special-purpose machine specifically designed, arranged and configured to perform specific tasks including those pertaining to wideband transmission schemes in wireless communications in accordance with various implementations of the present disclosure.

In some implementations, apparatus 1210 may also include a transceiver 1216 coupled to processor 1212. Transceiver 1216 may include a transmitter capable of wirelessly transmitting and a receiver capable of wirelessly receiving data. In some implementations, apparatus 1220 may also include a transceiver 1226 coupled to processor 1222. Transceiver 1226 may include a transmitter capable of wirelessly transmitting and a receiver capable of wirelessly receiving data.

In some implementations, apparatus 1210 may further include a memory 1214 coupled to processor 1212 and capable of being accessed by processor 1212 and storing data therein. In some implementations, apparatus 1220 may further include a memory 1224 coupled to processor 1222 and capable of being accessed by processor 1222 and storing data therein. Each of memory 1214 and memory 1224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1214 and memory 1224 may include a type of read-only memory (ROM) such as mask ROM, programmable ROM (PROM), erasable programmable ROM (EPROM) and/or electrically erasable programmable ROM (EEPROM). Alternatively, or additionally, each of memory 1214 and memory 1224 may include a type of non-volatile random-access memory (NVRAM) such as flash memory, solid-state memory, ferroelectric RAM (FeRAM), magnetoresistive RAM (MRAM) and/or phase-change memory.

Each of apparatus 1210 and apparatus 1220 may be a communication entity capable of communicating with each other using various proposed schemes in accordance with the present disclosure. For illustrative purposes and without limitation, a description of capabilities of apparatus 1210, as one of STA 110 and STA 120, and apparatus 1220, as the other of STA 110 and STA 120, is provided below. It is noteworthy that, although the example implementations described below are provided in the context of WLAN, the same may be implemented in other types of networks.

Under a proposed scheme pertaining to wideband transmission schemes in wireless communications in accordance with the present disclosure, processor 1212 of apparatus 1210 (e.g., implemented in or as STA 110 functioning as AP1 in scenario 200 and/or scenario 300), may obtain, via transceiver 1216, a TXOP in a wideband operating bandwidth comprising a primary channel and a plurality of non-primary channels. Additionally, processor 1212 may initiate, via transceiver 1216, a frame exchange to reserve the TXOP for TXOP sharing. Moreover, processor 1212 may share, via transceiver 1216, the primary channel with a basic service set (BSS) after the frame exchange.

In some implementations, the frame exchange may include a RTTX/CTTX frame exchange indicating at least one of the following: an occupied bandwidth, preamble puncture information, and a TXOP sharing duration.

In some implementations, in initiating the frame exchange, processor 1212 may initiate the frame exchange on the primary channel and one or more of the plurality of non-primary channels indicated in the frame exchange.

In some implementations, in initiating the frame exchange on the one or more of the plurality of non-primary channels, processor 1212 may initiate the frame exchange on the one or more of the plurality of non-primary channels which are idle during a PIFS interval before the frame exchange.

In some implementations, in performing the data transmission, processor 1212 may perform a data transmission on at least one of the plurality of non-primary channels reserved by the frame exchange.

In some implementations, the primary channel may be shared by a BSS (e.g., BSS 130) and an OBSS (e.g., OBSS 140) to initiate the frame exchange to reserve the TXOP for sharing. Additionally, the primary channel may include a 20-MHz primary channel. In such cases, the primary channel may be used for channel contention and transmission of control frames, management frames and broadcast frames but not data frames by non-legacy devices. In addition, the frame exchange may set or update an intra-BSS timer of a 3rd-party device associated with the BSS but does not set or update an inter-BSS timer of a 3rd-party device associated with the OBSS.

Under another proposed scheme pertaining to wideband transmission schemes in wireless communications in accordance with the present disclosure, processor 1222 of apparatus 1220 (e.g., implemented in or as STA 120 functioning as AP2 in scenario 200 and/or scenario 300), may detect, via transceiver 1226 and on a primary channel in a wideband operating bandwidth comprising the primary channel and a plurality of non-primary channels, a frame exchange which results in a TXOP being reserved for sharing. Additionally, processor 1222 may start or resume a backoff procedure to contend for a medium of the primary channel within the TXOP. Moreover, processor 1222 may initiate, via transceiver 1226, a WSTXOP within the TXOP. Moreover, processor 1222 may perform, via transceiver 1226, a data transmission within the TXOP on one or more of the plurality of non-primary channels. Furthermore, processor 1222 may perform, via transceiver 1226, a data transmission within the WSTXOP on one or more of the plurality of non-primary channels.

In some implementations, in detecting the frame exchange, processor 1222 may perform certain operations. For instance, processor 1222 may obtain information of a duration of the TXOP from one or more frames received from the frame exchange. Additionally, processor 1222 may set a WSTXOP timer based on the duration of the TXOP to limit a duration of the WSTXOP.

In some implementations, in starting or resuming of the backoff procedure, processor 1222 may start or resume a backoff timer after receiving at least one frame of a RTTX/CTTX frame exchange on the primary channel.

In some implementations, in initiating the WSTXOP, processor 1222 may initiate one other RTTX/CTTX frame exchange within the TXOP by transmitting a RTTX frame on the primary channel upon a backoff timer counting down to zero while the WSTXOP timer is not zero.

In some implementations, in initiating the other RTTX/CTTX frame exchange, processor 1222 may initiate the other RTTX/CTTX frame exchange on the primary channel and one or more of the plurality of non-primary channels.

In some implementations, in initiating the other RTTX/CTTX frame exchange on the one or more of the plurality of non-primary channels, processor 1222 may initiate the other RTTX/CTTX frame exchange on the one or more of the plurality of non-primary channels which are not included in the bandwidth indicated in the received RTTX/CTTX on the primary channel and are idle during a PIFS interval before the other RTTX/CTTX frame exchange.

In some implementations, in performing the data transmission, processor 1222 may perform certain operations. For instance, processor 1222 may perform the data transmission on at least one of the plurality of non-primary channels reserved by the other RTTX/CTTX frame exchange of the WSTXOP. Moreover, processor 1222 may apply, during the WSTXOP, preamble puncturing on one or more of the plurality of non-primary channels which are not idle.

In some implementations, the primary channel may be shared by a BSS (e.g., BSS 130) and an OBSS (e.g., OBSS 140). Additionally, the primary channel may include a 20-MHz primary channel. In such cases, the primary channel may be used for channel contention and transmission of control frames, management frames and broadcast frames but not data frames by non-legacy devices.

Illustrative Processes

Figure 13:
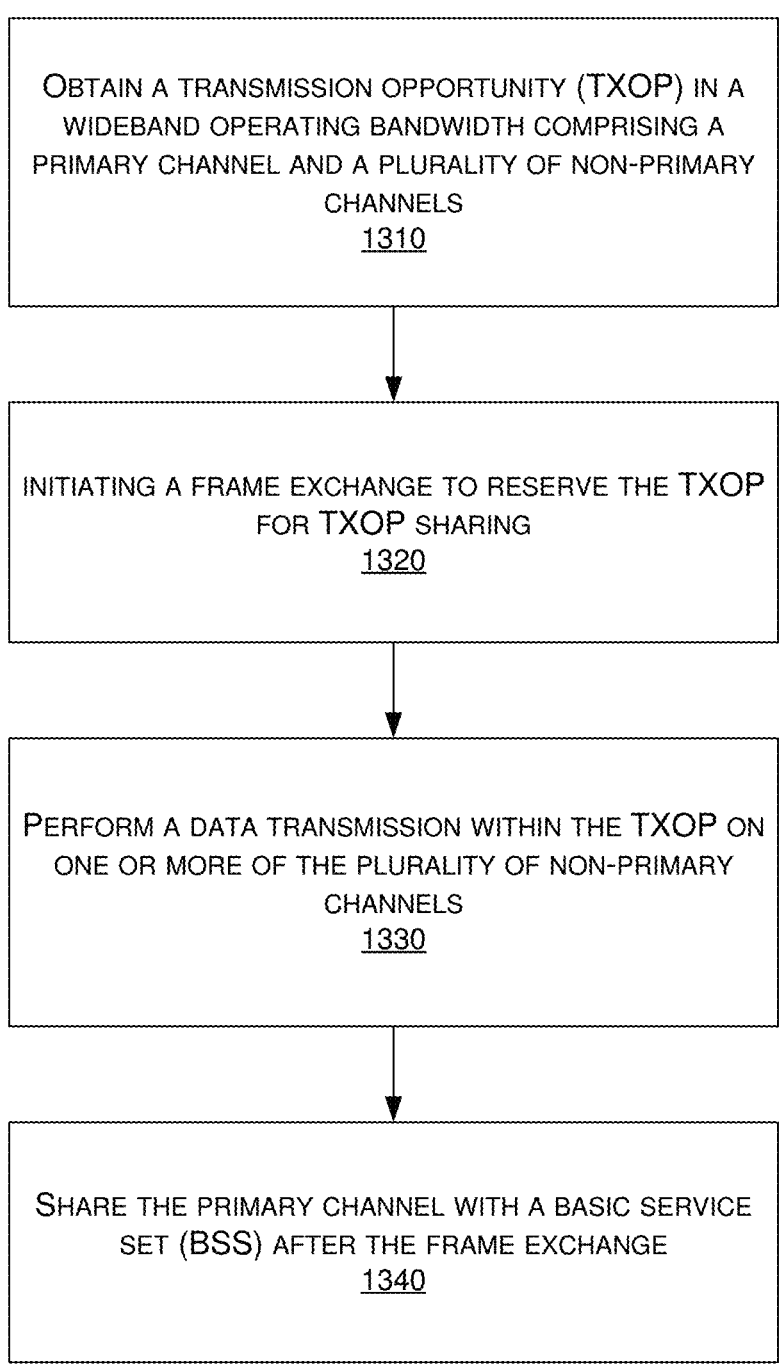
FIG. 13 is a flowchart of an example process in accordance with an implementation of the present disclosure.

FIG. 13 illustrates an example process 1300 in accordance with an implementation of the present disclosure. Process 1300 may represent an aspect of implementing various proposed designs, concepts, schemes, systems and methods described above. More specifically, process 1300 may represent an aspect of the proposed concepts and schemes pertaining to wideband transmission schemes in wireless communications in accordance with the present disclosure. Process 1300 may include one or more operations, actions, or functions as illustrated by one or more of blocks 1310, 1320, 1330 and 1340. Although illustrated as discrete blocks, various blocks of process 1300 may be divided into additional blocks, combined into fewer blocks, or eliminated, depending on the desired implementation. Moreover, the blocks/sub-blocks of process 1300 may be executed in the order shown in FIG. 13 or, alternatively in a different order. Furthermore, one or more of the blocks/sub-blocks of process 1300 may be executed repeatedly or iteratively. Process 1300 may be implemented by or in apparatus 1210 and apparatus 1220 as well as any variations thereof. Solely for illustrative purposes and without limiting the scope, process 1300 is described below in the context of apparatus 1210 implemented in or as STA 110 and apparatus 1220 implemented in or as STA 120 of a wireless network such as a WLAN in network environment 100 in accordance with one or more of IEEE 802.11 standards. Process 1300 may begin at block 1310.

At 1310, process 1300 may involve processor 1212 of apparatus 1210 obtaining, via transceiver 1216, a TXOP in a wideband operating bandwidth comprising a primary channel and a plurality of non-primary channels. Process 1300 may proceed from 1310 to 1320.

At 1320, process 1300 may involve processor 1212 initiating, via transceiver 1216, a frame exchange to reserve the TXOP for TXOP sharing. Process 1300 may proceed from 1320 to 1330.

At 1330, process 1300 may involve processor 1212 performing, via transceiver 1216, a data transmission within the TXOP on one or more of the plurality of non-primary channels. Process 1300 may proceed from 1330 to 1340.

At 1340, process 1300 may involve processor 1212 sharing, via transceiver 1216, the primary channel with a basic service set (BSS) after the frame exchange.

In some implementations, the frame exchange may include a RTTX/CTTX frame exchange indicating at least one of the following: an occupied bandwidth, preamble puncture information, and a TXOP sharing duration.

In some implementations, in initiating the frame exchange, process 1300 may involve processor 1212 initiating the frame exchange on the primary channel and one or more of the plurality of non-primary channels indicated in the frame exchange.

In some implementations, in initiating the frame exchange on the one or more of the plurality of non-primary channels, process 1300 may involve processor 1212 initiating the frame exchange on the one or more of the plurality of non-primary channels which are idle during a PIFS interval before the frame exchange.

In some implementations, process 1300 may further involve processor 1212 performing a data transmission on at least one of the plurality of non-primary channels reserved by the frame exchange.

In some implementations, the primary channel may be shared by a BSS (e.g., BSS 130) and an OBSS (e.g., OBSS 140) to initiate the frame exchange to reserve the TXOP for sharing. Additionally, the primary channel may include a 20-MHz primary channel. In such cases, the primary channel may be used for channel contention and transmission of control frames, management frames and broadcast frames but not data frames by non-legacy devices. In addition, the frame exchange may set or update an intra-BSS timer of a 3rd-party device associated with the BSS but does not set or update an inter-BSS timer of a 3rd-party device associated with the OBSS.

Figure 14:
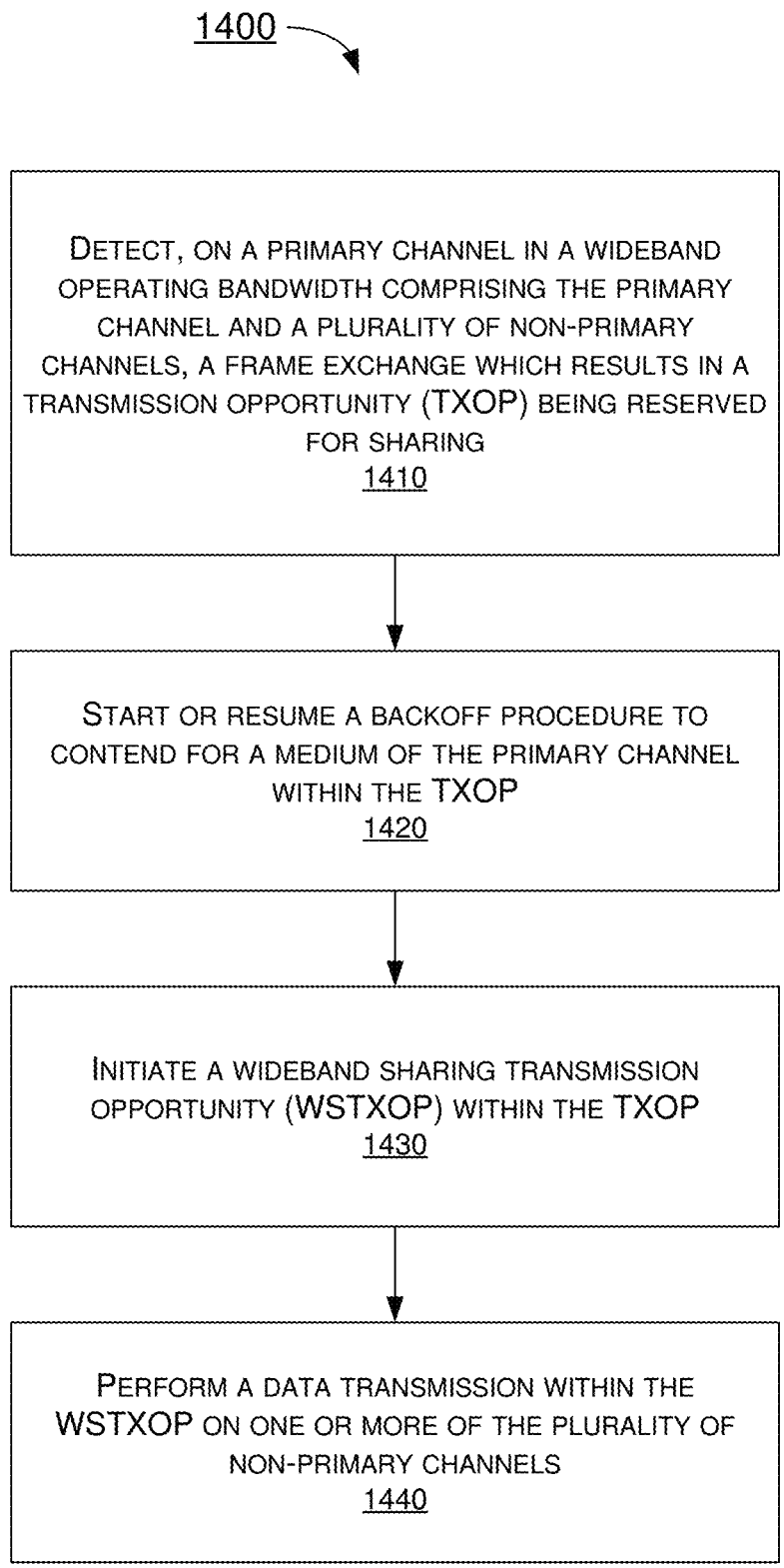
FIG. 14 is a flowchart of an example process in accordance with an implementation of the present disclosure.

FIG. 14 illustrates an example process 1400 in accordance with an implementation of the present disclosure. Process 1400 may represent an aspect of implementing various proposed designs, concepts, schemes, systems and methods described above. More specifically, process 1400 may represent an aspect of the proposed concepts and schemes pertaining to wideband transmission schemes in wireless communications in accordance with the present disclosure. Process 1400 may include one or more operations, actions, or functions as illustrated by one or more of blocks 1410, 1420, 1430 and 1440. Although illustrated as discrete blocks, various blocks of process 1400 may be divided into additional blocks, combined into fewer blocks, or eliminated, depending on the desired implementation. Moreover, the blocks/sub-blocks of process 1400 may be executed in the order shown in FIG. 14 or, alternatively in a different order. Furthermore, one or more of the blocks/sub-blocks of process 1400 may be executed repeatedly or iteratively. Process 1400 may be implemented by or in apparatus 1210 and apparatus 1220 as well as any variations thereof. Solely for illustrative purposes and without limiting the scope, process 1400 is described below in the context of apparatus 1210 implemented in or as STA 110 and apparatus 1220 implemented in or as STA 120 of a wireless network such as a WLAN in network environment 100 in accordance with one or more of IEEE 802.11 standards. Process 1400 may begin at block 1410.

At 1410, process 1400 may involve processor 1222 of apparatus 1220 detecting, via transceiver 1226 and on a primary channel in a wideband operating bandwidth comprising the primary channel and a plurality of non-primary channels, a frame exchange which results in a TXOP being reserved for sharing. Process 1400 may proceed from 1410 to 1420.

At 1420, process 1400 may involve processor 1222 starting or resuming a backoff procedure to contend for a medium of the primary channel within the TXOP. Process 1400 may proceed from 1420 to 1430.

At 1430, process 1400 may involve processor 1222 initiating, via transceiver 1226, a WSTXOP within the TXOP. Process 1400 may proceed from 1430 to 1440.

At 1440, process 1400 may involve processor 1222 performing, via transceiver 1226, a data transmission within the WSTXOP on one or more of the plurality of non-primary channels.

In some implementations, in detecting the frame exchange, process 1400 may involve processor 1222 performing certain operations. For instance, process 1400 may involve processor 1222 obtaining information of a duration of the TXOP from one or more frames received from the frame exchange. Additionally, process 1400 may involve processor 1222 setting a WSTXOP timer based on the duration of the TXOP to limit a duration of the WSTXOP.

In some implementations, in starting or resuming of the backoff procedure, process 1400 may involve processor 1222 starting or resuming a backoff timer after receiving at least one frame of a RTTX/CTTX frame exchange on the primary channel.

In some implementations, in initiating the WSTXOP, process 1400 may involve processor 1222 initiating one other RTTX/CTTX frame exchange within the TXOP by transmitting a RTTX frame on the primary channel upon a backoff timer counting down to zero while the WSTXOP timer is not zero.

In some implementations, in initiating the other RTTX/CTTX frame exchange, process 1400 may involve processor 1222 initiating the other RTTX/CTTX frame exchange on the primary channel and one or more of the plurality of non-primary channels.

In some implementations, in initiating the other RTTX/CTTX frame exchange on the one or more of the plurality of non-primary channels, process 1400 may involve processor 1222 initiating the other RTTX/CTTX frame exchange on the one or more of the plurality of non-primary channels which are not included in the bandwidth indicated in the received RTTX/CTTX on the primary channel and are idle during a PIFS interval before the other RTTX/CTTX frame exchange.

In some implementations, in performing the data transmission, process 1400 may involve processor 1222 performing certain operations. For instance, process 1400 may involve processor 1222 performing the data transmission on at least one of the plurality of non-primary channels reserved by the other RTTX/CTTX frame exchange of the WSTXOP. Moreover, process 1400 may involve processor 1222 applying, during the WSTXOP, preamble puncturing on one or more of the plurality of non-primary channels which are not idle.

In some implementations, the primary channel may be shared by a BSS (e.g., BSS 130) and an OBSS (e.g., OBSS 140). Additionally, the primary channel may include a 20-MHz primary channel. In such cases, the primary channel may be used for channel contention and transmission of control frames, management frames and broadcast frames but not data frames by non-legacy devices.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   obtaining a transmission opportunity (TXOP) in a wideband operating bandwidth comprising a primary channel and a plurality of non-primary channels;
   initiating a frame exchange to reserve the TXOP for TXOP sharing;
   performing a data transmission within the TXOP on one or more of the plurality of non-primary channels; and
   sharing the primary channel with an overlapping basic service set (OBSS) after the frame exchange,
   wherein the primary channel is shared by a basic service set (BSS) and the OBSS to initiate the frame exchange to reserve the TXOP for sharing, and
   wherein the frame exchange sets or updates an intra-BSS timer of a $3^{rd}$-party device associated with the BSS but does not set or update an inter-BSS timer of a $3^{rd}$-party device associated with the OBSS.

2. The method of claim 1, wherein the frame exchange comprises a request-to-transmit and clear-to-transmit (RTTX/CTTX) frame exchange indicating at least one of a occupied bandwidth, preamble puncture information, and a TXOP sharing duration.

3. The method of claim 1, wherein the initiating of the frame exchange comprises initiating the frame exchange on the primary channel and one or more of the plurality of non-primary channels indicated in the frame exchange.

4. The method of claim 3, wherein the initiating of the frame exchange on the one or more of the plurality of non-primary channels comprises initiating the frame exchange on the one or more of the plurality of non-primary channels which are idle during a point coordination function (PCF) inter-frame space (PIFS) interval before the frame exchange.

5. The method of claim 1, wherein the performing of the data transmission comprises performing the data transmission on at least one of the plurality of non-primary channels which are reserved by the frame exchange.

6. The method of claim 1, wherein the primary channel comprises a 20-MHz primary channel.

7. The method of claim 1, wherein the primary channel is used for channel contention and transmission of control frames, management frames and broadcast frames but not data frames by non-legacy devices.

8. A method, comprising:
  detecting, on a primary channel in a wideband operating bandwidth comprising the primary channel and a plurality of non-primary channels, a frame exchange which results in a transmission opportunity (TXOP) being reserved for sharing;
  starting or resuming a backoff procedure to contend for a medium of the primary channel within the TXOP;
  initiating a wideband sharing transmission opportunity (WSTXOP) within the TXOP; and
  performing a data transmission within the WSTXOP on one or more of the plurality of non-primary channels,
  wherein the detecting of the frame exchange comprises:
    obtaining information of a duration of the TXOP from one or more frames received from the frame exchange; and
    setting a WSTXOP timer based on the duration of the TXOP to limit a duration of the WSTXOP,
  wherein the starting or resuming of the backoff procedure comprises starting or resuming a backoff timer after receiving at least one frame of a request-to-transmit and clear-to-transmit (RTTX/CTTX) frame exchange on the primary channel, and
  wherein the initiating of the WSTXOP comprises initiating one other RTTX/CTTX frame exchange within the TXOP by transmitting a RTTX frame on the primary channel upon a backoff timer counting down to zero while the WSTXOP timer is not zero.

9. The method of claim 8, wherein the initiating of the other RTTX/CTTX frame exchange comprises initiating the other RTTX/CTTX frame exchange on the primary channel and one or more of the plurality of non-primary channels.

10. The method of claim 9, wherein the initiating of the other RTTX/CTTX frame exchange on the one or more of the plurality of non-primary channels comprises initiating the other RTTX/CTTX frame exchange on the one or more of the plurality of non-primary channels which are not included in the bandwidth indicated in the received RTTX/CTTX on the primary channel and are idle during a point coordination function (PCF) inter-frame space (PIFS) interval before the other RTTX/CTTX frame exchange.

11. The method of claim 8, wherein the performing of the data transmission comprises performing the data transmission on at least one of the plurality of non-primary channels reserved by the other RTTX/CTTX frame exchange of the WSTXOP.

12. The method of claim 11, wherein the performing of the data transmission further comprises applying, during the WSTXOP, preamble puncturing on one or more of the plurality of non-primary channels which are not idle.

13. The method of claim 8, wherein the primary channel is shared by a basic service set (BSS) and an overlapping basic service set (OBSS), and wherein the primary channel comprises a 20-MHz primary channel.

14. The method of claim 8, wherein the primary channel is used for channel contention and transmission of control frames, management frames and broadcast frames but not data frames by non-legacy devices.

15. An apparatus, comprising:
  a transceiver; and
  a processor coupled to the transceiver and configured to perform operations comprising:
    obtaining a transmission opportunity (TXOP) in a wideband operating bandwidth comprising a primary channel and a plurality of non-primary channels;
    initiating a frame exchange to reserve the TXOP for TXOP sharing;
    performing a data transmission within the TXOP on one or more of the plurality of non-primary channels; and
    sharing the primary channel with an overlapping basic service set (OBSS) after the frame exchange,
  wherein the primary channel is shared by a basic service set (BSS) and the OBSS to initiate the frame exchange to reserve the TXOP for sharing, and
  wherein the frame exchange sets or updates an intra-BSS timer of a $3^{rd}$-party device associated with the BSS but does not set or update an inter-BSS timer of a $3^{rd}$-party device associated with the OBSS.

16. The apparatus of claim 15, wherein the processor is further configured to perform operations comprising:
  starting or resuming a backoff procedure to contend for a medium of the primary channel within the TXOP;
  initiating a wideband sharing transmission opportunity (WSTXOP) within the TXOP; and
  performing a data transmission within the WSTXOP on one or more of the plurality of non-primary channels.

* * * * *